United States Patent [19]

Ninagawa et al.

[11] 4,221,639
[45] Sep. 9, 1980

[54] ALUMINIUM ALLOY CYLINDER AND MANUFACTURING METHOD THEREOF

[75] Inventors: Chikato Ninagawa, Tokyo; Tadashi Ozaki; Minoru Yonekawa, both of Yokosuka; Hitoshi Harada, Yokohama, all of Japan

[73] Assignee: Kioritz Corporation, Tokyo, Japan

[21] Appl. No.: 43,570

[22] Filed: May 29, 1979

[30] Foreign Application Priority Data

Oct. 9, 1978 [JP] Japan .................. 53-124325

[51] Int. Cl.² .................. C25D 3/20; C25D 5/50; C25D 7/04; F02F 1/20
[52] U.S. Cl. .................. 204/26; 123/193 C; 204/37 R; 204/48
[58] Field of Search .................. 204/23, 25, 26, 48, 204/37 R, 38 R; 123/193 C

[56] References Cited

U.S. PATENT DOCUMENTS

| | | | |
|---|---|---|---|
| 1,975,818 | 10/1934 | Work | 204/23 |
| 2,412,698 | 12/1946 | van der Horst | 204/26 |
| 3,404,074 | 10/1968 | Klingenmaier | 204/25 |
| 4,065,365 | 12/1977 | Ibarguengoitia | 204/25 |

OTHER PUBLICATIONS

*Plating*, Aug. 1974, pp. 741–746.

*Primary Examiner*—T. M. Tufariello
*Attorney, Agent, or Firm*—Karl W. Flocks

[57] ABSTRACT

An aluminium alloy cylinder includes a cylinder body and a cylinder bore therein. An iron layer is electrodeposited on the wall surface of the cylinder bore by means of a high cathode current density so that a multiplicity of randomly oriented channels are formed in the electrodeposited iron layer.

16 Claims, 4 Drawing Figures

ALUMINIUM ALLOY CYLINDER AND MANUFACTURING METHOD THEREOF

BACKGROUND OF THE INVENTION

1. Field of the Invention

The present invention relates to an aluminium alloy cylinder and a method of manufacturing the same, more particularly to an aluminium alloy cylinder in which an iron layer is electrodeposited on the wall surface of a cylinder bore in the cylinder, and a method of manufacturing the aluminium alloy cylinder.

2. Description of the Prior Art

Today, aluminium alloy cylinder bodies are widely utilized, because the cylinder body is light in weight and superior in thermal conductivity, can be relatively easily manufactured by means of a sandmold casting process, permanent mold casting process or die casting, and has an adequate or sufficient strength. However, in order to apply such aluminium alloy cylinder to high power engines or two- or four-stroke engines, it is required to subject the wall surface of the cylinder bore to a surface treatment for the purposes of prevention of seizure or scoring and provision of a wear resistant surface.

It has been proposed as such surface treatments to electrodeposit or electroplate a hard metal, for example, such as chromium or the like on the wall surface of the cylinder bore. However, the electrodeposition for such metal requires long working time, and the finishing for the electrodeposited metal requires also long working time. In addition, the electroplating treatment of such metal is not preferable from the point of view of public pollution problem, because the electroplating effluents are extremely harmful. Furthermore, in the conventional cylinder with the hard metal being electroplated, it is difficult to maintain a continuous lubricant film on the sliding surface of the cylinder, and abrasive dust or metals produced from the wear or abrasion and extremely small solid hard materials coming from outside are retained on the sliding surface. This causes abrasion loss, seizure loss and scaffing or scoring loss between the sliding surface of the cylinder and the outer peripheral surface of a piston or piston ring thereon, and decreases the durability of the cylinder.

In order to maintain a continuous lubricant film on the sliding surface of the cylinder and to prevent the abrasive dust and extremely small external solid hard materials from remaining on the sliding surface, it has been proposed in the prior art to form projections of hard particles of microscopic size on the sliding surface, or inversely to form concaves of microscopic size to receive the abrasive dust and the extremely small external solid hard materials between the projections or in the concaves. However, these require precision machining and make difficult the manufacture of the cylinder.

SUMMARY OF THE INVENTION

An object of the present invention is to provide an aluminium alloy cylinder which is easy to manufacture and superior in durability.

Another object of the present invention is to provide a method of manufacturing the aluminium alloy cylinder.

According to the present invention, there is provided an aluminium alloy cylinder comprising a cylinder body, a cylinder bore in the body, and an iron layer electrodeposited on the wall surface of the cylinder bore, the layer having therein a multiplicity of randomly oriented channels.

According to the present invention, there is further provided a method of manufacturing an aluminium alloy cylinder including a cylinder body and a cylinder bore therein, the method comprising the steps of: subjecting the wall surface of the cylinder bore to a process of preparation for electroplating; and subjecting the thus prepared wall surface of the cylinder bore to an iron electroplating treatment to electrodeposit an iron layer on the wall surface of the cylinder bore by means of a high cathode current density to form a multiplicity of randomly oriented channels in the electrodeposited iron layer.

In the aluminium alloy cylinder, it is preferable to form a multiplicity of circumferential grooves spaced from each other axially of the cylinder, in the electrodeposited iron layer to further improve the durability of the cylinder.

BRIEF DESCRIPTIONS OF THE DRAWINGS

DETAILED DESCRIPTIONS OF PREFERRED EMBODIMENTS

Figure 1:
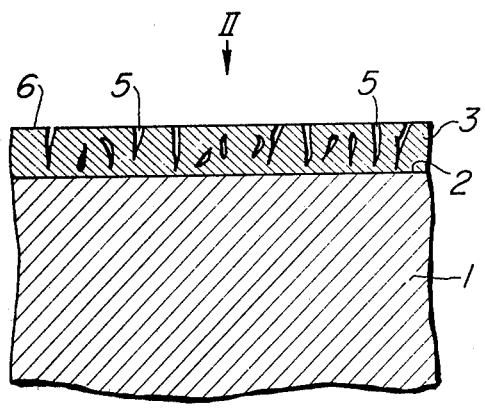
FIG. 1 is a diagrammatic cross-sectional view showing a part of an aluminium alloy cylinder according to the present invention.

Referring to FIG. 1, an aluminium alloy cylinder includes a cylinder body 1 and a cylinder bore 2 formed therein. The cylinder bore 2 has a wall surface which is finished by means of fine boring so as to have a smooth surface. The smoothly finished wall surface of the cylinder bore 2 is conventionally treated in preparation for an electroplating process. The preparation for electroplating includes the steps of alkali degreasing, water rinsing, picking, water rinsing, zincate process (zinc chemical displacement treatment), water rinsing, copper striking, water rinsing and hot water rinsing, in order. It is preferable to utilize the Bondal Process of Canning Co., Ltd. of Great Britain, which includes the zincate process and the copper striking in combination, to shorten the time duration required for the conventional copper striking.

The prepared wall surface of the cylinder bore 2 is then subjected to an iron electroplating treatment. The solution for the electroplating treatment includes metallic iron of 150–250 gr/l and boric acid of 20–50 gr/l, and has pH 0.2–0.6; it is used at a temperature of 50°–80° C. Using a solution, the cathode current density of 200–400 A/dm$^2$ is passed 30–60 seconds. As the result, an iron layer 3 having a thickness of 20–80 μm and a hardness of Hv 500–700 is electrodeposited on the wall surface of the cylinder bore 2, as shown in FIG. 1.

If the pickling treatment, zincate process and copper striking are completely subjected to the wall surface of the cylinder bore to be electroplated, a superior adhesion is obtained between the electrodeposited iron layer 3 and the wall surface of the cylinder bore 2. Since the electrodeposition is made at the high cathode current density of 200–400 A/dm$^2$, and the excellent adhesion is obtained between the electrodeposited iron layer 3 and the wall surface of the cylinder bore 2, a multiplicity of tortoise-shell like deep channels or randomly oriented deep channels 5, i.e., cracks each having a wide opening width are formed in the iron layer 3, particularly 500–1000 per unit area (mm$^2$).

After the electroplating treatment, the surface of the electrodeposited iron layer 3 is finished by means of honing to remove the thickness of a few micron meters from the iron layer surface, thereby to provide an effective sliding surface 6.

The randomly oriented channels 5 function to receive therein a lubricant to maintain a continuous lubricant film on the sliding surface 6 of the electrodeposited iron layer 3. In addition, the channels 5 also function to receive abrasive dust or metals produced from the wear or abrasion and the extremely small solid hard materials coming from outside to prevent such materials from remaining on the sliding surface 6, thereby to prevent the discontinuity of the lubricant film, and the seizure loss and scaffing or scoring loss due to the materials. Thus, there is provided an engine cylinder which is superior in durability.

It is preferable to apply a water displacement type rust-preventive agent to the sliding surface 6 just after the water rinsing of the plated iron layer while the plated iron layer is under wet condition, to prevent the iron layer 3 from being oxidized. The rust-preventive agent excludes the water out of and penetrates into the randomly oriented deep channels 5 to prevent the iron layer from being oxidized for a long period of time. Because the water displacement type rust-preventive agent has also lubricating effects, the agent does not hinder the engine operation.

In addition, after the electroplating treatment, it is preferable to subject the electrodeposited iron layer to an annealing at approximately 250° C. to relieve stress therein and to increase the opening width of each of the channels 5, thereby to further increase the capacity of the channels for receiving the lubricant, abrasive dust and extremely small solid hard materials coming from outside. The iron layer 3 electrodeposited by means of high cathode current density does not become soft by the reheating up to 450° C., and the annealing does not hinder the engine operation.

Tests have revealed that the randomly oriented deep channels 5 caused in the iron layer 3 electrodeposited by means of high cathode current density did not disappear after the engine operation for a long period of time.

Figure 2:
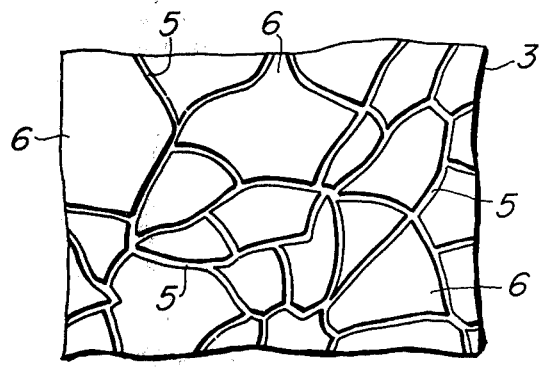
FIG. 2 is a top plan view as viewed from the direction indicated by the arrow II in FIG. 1.

According to an example of the cylinder shown in FIGS. 1 and 2, there is provided an electrodeposited iron layer having a thickness of 50 μm, when the electroplating is made under the following conditions (a) the cathode current density in the electroplating treatment: 250 A/dm$^2$; (b) the time duration during which the current is passed: 50 seconds; and (c) the temperature of the electroplating solution: 70° C.

As described above, in the aluminium alloy cylinder according to the present invention, since the iron layer 3 electrodeposited with high cathode current density has a high affinity with respect to the lubricant, and the randomly oriented deep channels 5 formed in the iron layer 3 function as reservoirs receiving the lubricant, a continuous lubricant film having a sufficient quantity is maintained on the sliding surface 6. In addition, the channels 5 receive the abrasive dust and the extremely small external solid hard materials to reduce the friction between the sliding surface 6 and the outer peripheral surface of the piston or piston ring thereon, thereby to enable the sliding surface 6 to be effectively prevented from being scaffed or scored. Thus, a superior durability is provided for the engine cylinder. Furthermore, because the time duration during which the electric current is passed is extremely short, i.e., 30–60 seconds, the time duration required for the electroplating treatment can be considerably shortened. Additionally, since the layer electrodeposited is an iron layer, the time duration required for the finishing of the iron layer by means of honing can also be considerably shortened.

Figure 3:
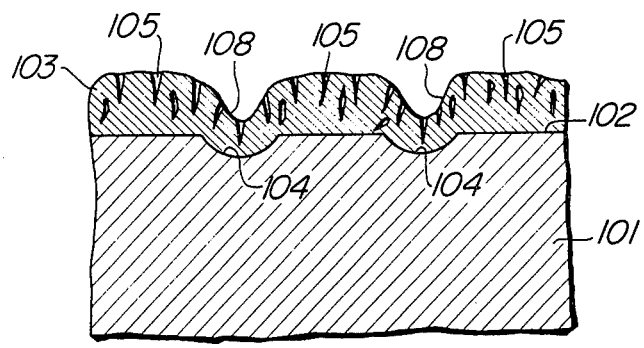
FIG. 3 is a diagramatic cross-sectional view showing a part of a further embodiment of the present invention, with the cylinder under condition prior to being subjected to a finishing step.
Figure 4:
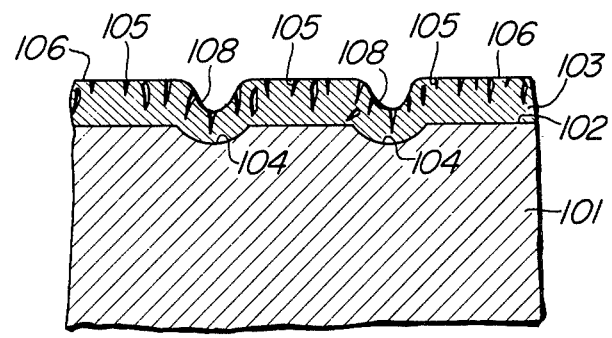
FIG. 4 is a view similar to FIG. 3, but showing the cylinder under condition after having been subjected to the finishing step.

FIGS. 3 and 4 show another embodiment of the present invention. The aluminium alloy cylinder shown in FIGS. 3 and 4 includes a cylinder body 101 and a cylinder bore 102 formed therein. The wall surface of the cylinder bore 102 is finished by means of fine boring so as to have a smooth surface. Thereafter, the wall surface of the cylinder bore is subjected to a threading machining under the conditions including the radius of curvature in the tip of the cutting tool: 0.1 mm; the grain depth of cut: 0.02 mm; and the feed pitch: 0.25 mm, to form a multiplicity of circumferential grooves 104 spaced from each other axially of the cylinder in the wall surface of the cylinder bore 102. The wall surface of the cylinder bore 102 with the thus formed circumferential grooves 104 is then subjected to an electroplating preparation and iron electroplating treatment similar to those described with reference to FIGS. 1 and 2, to electrodeposit on the wall surface of the cylinder bore 102 an iron layer 103 having therein randomly oriented deep channels 105. Since the circumferential grooves 104 are formed on the wall surface of the cylinder bore 102, and the iron layer 103 is electrodeposited on the cylinder bore wall surface which has formed thereon the grooves 104, corresponding circumferential grooves 108 spaced from each other axially of the cylinder are formed in the iron layer 103 electrodeposited on the wall surface of the cylinder bore 102, as shown in FIG. 3. In addition, since the electrodeposition of the iron layer 103 is made with high cathode current density, the iron layer is electrodeposited on the wall surface of the cylinder bore 102 such that each of portions of the iron layer located on the flat surface portions between the adjacent grooves 104 of the cylinder bore wall surface has a thickness greater than that of each of portions of the iron layer located on the grooves 104. As the result, each of the circumferential grooves 108 formed in the electrodeposited iron layer 103 has an axial opening width less than that of each of the circumferential grooves 104 formed in the cylinder bore wall surface.

Thereafter, as shown in FIG. 4, only the thicker portions of the electrodeposited iron layer between the adjacent circumferential grooves 108 are finished to a predetermined thickness by means of honing using a soft honing stone. Thus, flat portions each having rounded edges are formed between the adjacent circumferential grooves 108, and function as a sliding surface 106. Since each of the portions of the iron layer which are electrodeposited on the flat portions of the cylinder bore 102 has a thicker thickness, it is possible to facilitate the finishing honing working with respect to cylinders having a plurality of ports, such as 2-stroke engine cylinders. In addition, each of the circumferential grooves 108 formed in the iron layer 103 has an axial opening width less than that of each of the circumferential grooves 104 formed in the wall surface of the cylinder bore 102. Thus, it becomes possible to easily form in the cylinder sliding surface deep grooves which are difficult to be formed by means of machining.

The sliding surface 106 finished and formed after the electroplating is a surface which is subjected to a load during the running of engine. Furthermore, the circumferential grooves 108 function as reservoirs for lubricant and as concaves receiving the abrasive dust and the extremely small external solid hard materials.

Accordingly, it is preferable that the ratio of the axial width of each of the flat portions of the sliding surface 106 between the adjacent circumferential grooves 108 to the axial opening width of each of the circumferential grooves 108 is approximately 2. It is also preferable that each of the circumferential grooves 108 has a deep radial depth, because the grooves 108 are required to function not only as reservoirs for lubricant, but also as concaves for receiving abrasive dust and extremely small solid hard materials coming from outside.

According to an example of the cylinder of the present invention shown in FIGS. 3 and 4, there is provided an electrodeposited iron layer having a thickness of approximately 50 $\mu$m, under the electroplating conditions including (a) the cathode current density in the electroplating treatment: 350 A/dm$^2$; (b) the time duration during which the electric current is passed: 39 seconds; and the temperature of the electroplating solution: 70° C. When a honing finish is applied to the thus electrodeposited iron layer to remove the thickness of about 16 $\mu$m from the iron layer surface, there is provided a cylinder in which the ratio of the axial width of each of the flat portions of the cylinder bore wall surface between the adjacent circumferential grooves 108 to the axial opening width of each of the circumferential grooves 108 is 2, and each of the circumferential grooves 108 has a radial depth of approximately 20 $\mu$m.

As described above, since the sliding surface 106 has the circumferential grooves 108 in addition to the randomly oriented channels 105, a greater amount of lubricant can be retained, and a greater amount of abrasive dust and extremely small solid hard materials coming from outside can be received, in comparison with the first-mentioned embodiment shown in FIGS. 1 and 2. Thus, it is possible to further improve the durability of the cylinder. In addition, the area of the sliding surface 106 which bears a load can be increased, because the circumferential grooves 104 formed in the wall surface of the cylinder bore 102 of the cylinder body 101 which is relatively soft and is easily machined produce in the iron layer electrodeposited with high cathode current density the circumferential grooves 108 each of which has an axial opening width less than that of each of the circumferential grooves 104. Furthermore, the circumferential grooves 108 can be more easily obtained than the case where the cylinder sliding surface is directly machined to form reservoirs in microscopical size for lubricant and concaves in microscopical size for receiving the abrasive dust and the extremely small solid hard materials coming from outside.

Of course, similarly to the embodiment shown in FIGS. 1 and 2, it is also preferable in the embodiment shown in FIGS. 3 and 4 to apply a water displacement type rust-preventive agent to the sliding surface and to anneal the iron layer, after the water rinsing of the plated iron layer.

What we claim is:

1. An aluminium alloy cylinder comprising a cylinder body, a cylinder bore in said body, a hard iron layer electrodeposited on the wall surface of said cylinder bore, and a multiplicity of randomly oriented channels formed in said hard iron layer, said channels being developed in said hard iron layer during the electrodeposition of said hard iron layer on the wall surface of said cylinder bore by means of a high cathode current density with each of said channels having an opening width sufficient to receive therein lubricant and abrasive dust.

2. An aluminium alloy cylinder claimed in claim 1, further comprising a multiplicity of circumferential grooves formed in the surface of said iron layer and spaced from each other axially of the cylinder.

3. An aluminium alloy cylinder claimed in claim 2, wherein the ratio of the axial width of each of portions of said iron layer between the adjacent circumferential grooves therein to the axial opening width of each of said circumferential grooves is approximately 2.

4. An aluminium alloy cylinder claimed in claim 1, 2 or 3, wherein water-replacement type rust-preventive agent is applied to the surface of said iron layer.

5. An aluminium alloy cylinder claimed in claim 1, 2 or 3, wherein said iron layer has a thickness of 20–80 $\mu$m.

6. An aluminium alloy cylinder claimed in claim 1, 2 or 3, wherein said iron layer has a hardness of Hv 500–700.

7. A method of manufacturing an aluminium alloy cylinder including a cylinder body and a cylinder bore therein comprising the steps of:
   (a) subjecting the wall surface of said cylinder bore to a preparation for electroplating; and
   (b) subjecting the thus prepared wall surface of said cylinder bore to an iron electroplating treatment to electrodeposit a hard iron layer on the wall surface of said cylinder bore by means of a cathode current density so sufficiently high as to develop during the iron electroplating treatment a multiplicity of randomly oriented channels in said hard iron layer with each of said channels having an opening width sufficient to receive therein lubricant and abrasive dust.

8. A method claimed in claim 7, further comprising the steps of:
   prior to said step (a), machining the wall surface of said cylinder bore to form a multiplicity of circumferential grooves spaced from each other axially of the cylinder;
   said iron layer being electrodeposited onto the wall surface of said cylinder bore having formed therein said circumferential grooves so that said iron layer has circumferential grooves corresponding to said circumferential grooves formed in the wall surface of said cylinder bore; and
   after said step (b), finishing only portions of said iron layer between the adjacent circumferential grooves therein so that each of the portions of said iron layer has a flat surface.

9. A method claimed in claim 8, wherein the ratio of the axial width of each of said portions of said iron layer between the adjacent circumferential grooves formed therein to the axial opening width of each of said circumferential grooves formed in said iron layer is approximately 2.

10. A method claimed in claim 7, 8 or 9, further comprising the step of applying water-replacement type rust-preventive agent to the surface of said iron layer just after the water rinsing of the electrodeposited iron layer.

11. A method claimed in claim 7, 8 or 9, further comprising the step of annealing said electrodeposited iron layer to increase the opening width of each of said randomly oriented channels formed in said iron layer.

12. A method claimed in claim 11, wherein said iron layer is annealed at the temperature of approximately 250° C.

13. A method claimed in claim 7, 8 or 9, wherein said iron layer is electrodeposited by means of the cathode current density of 200–400 A/dm$^2$.

14. A method claimed in claim 13, wherein the current of said cathode current density of 200–400 A/dm$^2$ is passed 30–60 seconds.

15. A method claimed in claim 7, 8 or 9, wherein said iron layer has a hardness of Hv 500–700.

16. A method claimed in claim 7, 8 or 9 wherein said iron layer has a thickness of 20–80 μm.

* * * * *